United States Patent Office

3,039,978
Patented June 19, 1962

3,039,978
COVULCANIZING BUTYL RUBBER AND A HIGH UNSATURATION RUBBER WITH A 2,6-DIHALO-METHYL ALKYLPHENOL RESIN
James V. Fusco, Westfield, and Samuel B. Robison, Roselle, N.J., assignors to Esso Research and Engineering Company, a corporation of Delaware
No Drawing. Filed Nov. 29, 1957, Ser. No. 699,524
1 Claim. (Cl. 260—5)

The present invention relates to covulcanizing low unsaturation rubbery polymers with high unsaturation rubbery polymers with polymethylol phenol curatives, as well as the covulcanizate obtained. More particularly, it relates to covulcanizing isoolefin-multiolefin rubber with high unsaturation hydrocarbon polymers, such as natural rubber or GR–S (butadiene-styrene), with polymethylol hydrocarbon substituted phenol substances, and especially halogenated polymethylol hydrocarbon phenol substances.

It is well known that it is difficult to covulcanize low unsaturation rubber, e.g. butyl rubber with high unsaturation rubber; however, because it is sometimes desirable to have these two polymers present in the same article, in certain instances the need is acute. The present invention remedies many of the obstacles which rubber compounders have heretofore encountered when they attempted to covulcanize these two polymer types.

According to the present invention, low unsaturation polymers are covulcanized with high unsaturation polymers by means of polymethylol phenol substances, particularly those which have been halogenated to some degree. The covulcanizates obtained have properties equivalent, and in some instances superior, to those possessed by butyl rubber alone, even though they contain as much as 90 weight percent or as little as 10 weight percent of high unsaturation rubber.

The halogenated polymethylol phenol compounds are especially preferred as curing agents, for while the non-halogenated form improves the physical properties to some degree it generally requires a much longer cure time to obtain similar results.

High unsaturation rubbers coming within the purview of the present invention have Wijs iodine numbers above 200, say about 200 to 400. The most common rubbers falling within this class are natural rubber and GR–S (styrene-butadiene), both of which are hydrocarbon rubbers.

Butyl rubber or GR–I (Government rubber-isobutylene) contains about 85–99.5% (preferably about 95–99.5%) of a $C_4$–$C_7$ isoolefin, such as isobutylene with about 15 to 0.5% (preferably about 5 to 0.5 wt. percent) of a multiolefin of about 4–14, preferably 4–8, carbon atoms. The expression "butyl rubber" as employed in the specification and claims, is intended to include copolymers having about 90–99.5% by weight of an isoolefin of about 4–7 carbon atoms and about 10 to 0.5% by weight of a conjugated multiolefin of about 4–10 carbon atoms. The preparation of butyl type rubbers is described in U.S. Patent 2,356,128. In general, the rubber comprises the reaction product of a $C_4$–$C_7$ isoolefin, preferably isobutylene with a $C_4$–$C_{10}$, preferably a $C_4$–$C_6$, conjugated diolefin such as isoprene, butadiene, dimethyl butadiene, piperylene, etc. The product of isobutylene and isoprene is preferred.

While the amount of high unsaturation rubber blended with low unsaturation rubber can vary over a wide range, the covulcanizates having the best properties are those which contain about 50 to 90 wt. percent of high unsaturation rubber and 10 to 50 wt. percent of low unsaturation rubber.

The halomethyl hydrocarbon-substituted phenol curing agents used in the present invention may be obtained by halogenating polymethylol phenols, such as 2,6-dimethylol parasubstituted phenols, either in the monomeric or polymeric form, so as to at least partially substitute halogen for the hydroxyl portion of the methylol groups. The halogenation may be carried out at temperatures ranging between about 0 and 150° C., but preferably from 20 to 80° C. using an appropriate halogenating agent.

Among the halogenating agents which have been found suitable for the purposes of the present invention are gaseous hydrogen fluoride, hydrogen chloride, hydrogen bromide, hydrogen iodide, or solutions thereof, gaseous chlorine, liquid bromine, alkali metal hypochlorites or hypobromites, concentrated aqueous hydrogen iodine solutions, $C_4$ to $C_{10}$ tertiary alkyl hypochlorites, sulfur bromides, sulfuryl chloride, pyridinium chloride perchloride, N-bromosuccinimide, alpha-chloracetoacetanilide, N,N'-dichloro-5,5 dimethylhydantoin, iodine halides, trichlorophenol chloride, N-chloroacetamide, beta-bromo-methyl phthalimide, etc. The preferred halogenating agents are gaseous hydrogen fluoride, hydrogen chloride, hydrogen bromide, hydrogen iodide, chlorine and substances which form hydrogen halide under reaction conditions, such as liquid bromine.

Generally the polymethylol compound or resin which is to be halogenated is dissolved in a substantially inert organic solvent, such as hexane, benzene, chloroform, or carbon tetrachloride, to form a 20 to 50 wt. percent solution which is then contacted with a halogenating agent according to conventional techniques for a period ranging from a few minutes up to several days, depending upon the reactivity of the specific halogenating agent. The amount of halogenating agent employed will vary according to the amount of halogen which is to be incorporated in the polymethylol substance. For instance, if one wishes to substitute halogen for both hydroxyl groups in the ortho position of 2,6-dimethylol octyl phenol, he should react 2 moles of hydrogen chloride with each mole of a dimethylol phenol compound. In some instances it may be desirable to use more or less than this amount of halogenating agent depending on whether or not the polymethylol substance is monomeric or polymeric. For example, the resin employed may have a halomethyl group at one end and a methylol group at the other end. Thus, one mole of a polymethylol phenol substance may be reacted with as little as 0.3 mole or as much as 4 moles of halogenating agent. The halogenated polymethylol hydrocarbon-substituted phenol can contain from 1 to 60 wt. percent of combined halogen but, for most purposes, it is not necessary to put more than about 30 wt. percent of combined halogen into the polymethylol compound to obtain a product having the wanted properties. Furthermore, the halogen content of the polymethylol phenol condensate will vary according to the particular halogen and according to the molecular weight of the phenol condensation product. For example, while the preferred chlorine or bromine content is between about 2 and 16 wt. percent, the preferred iodine content is between about 5 and 30 wt. percent of the condensate. Since the best cures and scorch safety properties are obtained with resins containing 2 to 12 wt. percent of combined halogen, these resins are especially preferred.

Some of the halomethyl hydrocarbon-substituted phenols coming within the purview of the present invention are those which have a hydrocarbon group in the meta or para position. The phenol portion may be either monohydric or polyhydric. The monomeric form of these curing agents falls under the following general formula:

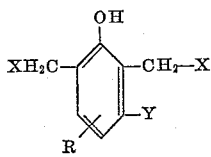

wherein R is an alkyl, aryl, or alkaryl hydrocarbon containing 4 to 16 carbon atoms located in the meta or para positions (4-5 position); X is a halogen such as fluorine, chlorine, bromine, or iodine; and Y is hydrogen or hydroxy.

Among the compounds coming under this general formula are 2,6-dichloromethyl-4-tertiarybutyl phenol, 2,6-dichloromethyl-4-octyl phenol, 2,6-diiodomethyl-4-dodecyl phenol, 2,6-dichloromethyl-4-phenyl phenol, 2,6-dibromomethyl-5-pentadecyl phenol, 2,6-dibromomethyl-5-pentadecyl resorcinol and 2,6-dibromomethyl-4-cumyl phenol. If desired, these compounds may be blended with polymethylol compounds or resins to obtain a composition having the desired curing rate.

Also, products obtained by the controlled halogenation of methylol containing resins prepared by the condensation of an aldehyde, for example, formaldehyde, with the following representative substituted phenols: 4-tertiarybutyl phenol, 4-octyl phenol, 4-dodecyl phenol, 4-phenyl phenol, 4-monoxy phenol, 4-hydroxydiphenyl methane, 2-bis-(4-hydroxy phenyl) propane, and 5-pentadecyl phenol, and mixtures thereof may be used directly to cure butyl rubber or they may be blended with non-halogenated methylol-containing resin to obtain the wanted reactivity.

The polymethylolhydrocarbon-substituted phenols can be prepared by reacting a substituted phenol having the two ortho positions unoccupied with a molar excess of an aldehyde. For instance, 2 moles of formaldehyde may be reacted with a mole of phenol compound in the presence of a strong alkaline catalyst, such as an alkali metal hydroxide, at a temperature between about 25 and 100° C. The 2,6-dimethylol phenol compound formed in this manner may be neutralized and isolated by acidification of the mixture and separation of the oily layer. If desired, the monomer may be polymerized by heating at elevated temperatures, e.g., 75 to 175° C. The polymer should be oil soluble and heat reactive. Suitable methods for the preparation of para-substituted dimethylol phenol compounds are described by Honel in U.S. Patent 1,996,069 and Charlton et al. in U.S. Patent 2,364,192. Alternately, the methylhalo hydrocarbon-substituted phenols may be made directly by condensing the phenol and aldehyde in the presence of a hydrogen halide or a hydrogen halide-forming substance.

One embodiment of the invention involves the use of polyvalent metal compounds which serve to assist the vulcanization. Among the compounds which have been found to be especially suitable are groups II and IV metal compounds such as magnesium oxide, zinc stearate, zinc carbonate, zinc oxide, zinc chloride, magnesium stearate, calcium oxide, calcium stearate, lead oxide, lead stearate, etc. Generally, these compounds should be used in an amount between about 1 and 30 parts by weight per 100 parts by weight of rubber; however, it is preferred to use about 2 to 10 parts by weight of these compounds.

If desired, prior to vulcanization, the rubber may be compounded with from 20 to 200 parts by weight of filler per 100 parts by weight of rubber. Suitable fillers include such things as channel blacks, furnace blacks, clays, silicates, etc. Vulcanizates having outstanding physical and dynamic properties have been obtained with from 30 to 75 parts by weight of carbon black per 100 parts by weight of rubber.

The rubber may also be compounded with extender and processing oils which may boil from about 400 to 700° F. Generally, between about 3 to 30 parts by weight of oil is compounded with 100 parts by weight of rubber. In addition, there may also be a mold release compound, such as stearic acid, present.

The vulcanization may be carried out from 10 to 100 minutes at temperatures varying from as low as 150° F. to as high as 400° F., or until the polymers commence to deteriorate. In general, it is best to employ temperatures of say 250 to 350° F. for periods of about 15 to 60 minutes.

Suitable recipes are as follows.

| Ingredient: | Parts by weight |
|---|---|
| Low unsaturation polymer | 10-90 |
| High unsaturation polymer | 90-10 |
| Extender oil | 0-30 |
| Stearic acid | 0-10 |
| Curing agent | 1-30 |
| Polyvalent metal compound | 1-30 |
| Filler | 20-100 |

The amount of polymethylol phenol, whether halogenated or not, necessarily will vary with the other conditions employed, but in general about 1 to 30 phr. should be used, and in most cases about 5 to 15 phr. is desirable. Since the halogenated material is quite active a lesser amount may be used or it may be blended with non-halogenated polymethylol phenols.

The vulcanizates prepared in accordance with the present invention may be used in many articles of manufacture, particularly tires, e.g. as the inner liner, hoses, curing bladders and the like. They are particularly adaptable for use in rubbery articles in which sulfur is objectionable.

The following examples serve to illustrate the various embodiments of the present invention:

EXAMPLE 1

Batches of synethetic polymer comprising a blend of isobutylene-isoprene butyl rubber, having a mole percent unsaturation of about 2.1 to 2.5 and a viscosity average molecular weight of about 300,000 to 350,000, and butadiene styrene rubber (GR-S-1500), prepared according to the procedure described on pages 1500-1 of the book GR-S and GR-I Synthetic Rubbers issued by Reconstruction Finance Corporation, were made in a laboratory #00 Banbury according to the following recipe:

| Ingredient | Parts by Weight | | | |
|---|---|---|---|---|
| | 1 | 2 | 3 | 4 |
| GR-S | | 25 | 75 | 100 |
| Butyl Rubber | 100 | 75 | 25 | |
| HAF Carbon Black | 50 | 50 | 50 | 50 |
| Stearic Acid | 1.0 | 1.0 | 1.0 | 1.0 |

The curative, in this case Amberol ST-137 (12 phr.), 5 phr. of Neoprene GN and 5 phr. of zinc oxide were added to portions of each batch on a 12″ laboratory mill and the milled samples were cured for 30 and 60 minutes at 307° F. The stress-strain properties are set forth in Table I:

*Table I*

| Sample No. | 1 | | 2 | | 3 | | 4 | |
|---|---|---|---|---|---|---|---|---|
| Cure Time, min. @ 307° F | 30 | 60 | 30 | 60 | 30 | 60 | 30 | 60 |
| Modulus @ 200%, p.s.i | 325 | 475 | 500 | 800 | 350 | 700 | 250 | 650 |
| Modulus @ 300%, p.s.i | 475 | 750 | 650 | 1,100 | 575 | 1,225 | 400 | 1,225 |
| Tensile, p.s.i | 1,550 | 1,945 | 785 | 1,300 | 1,100 | 2,290 | 1,125 | 2,405 |
| Elongation, percent | 890 | 660 | 560 | 400 | 680 | 500 | 900 | 500 |
| Hardness (Shore A) | 68 | 70 | 70 | 70 | 65 | 67 | 58 | 60 |

Amberol ST-137 is made by condensing p-octyl phenol with formaldehyde in the presence of sodium hydroxide. It contains about 6% methylol groups.

The stress-strain data show that when this type of condensate is used, even when accelerated with neoprene, the vulcanization is sluggish. The best results were obtained where the GR-S was the major rubbery component and butyl rubber was the minor component. For this reason this blend, e.g. 50 to 90 wt. percent high unsaturation rubber and 10 to 50 wt. percent butyl, is preferred.

EXAMPLE 2

The above experiment was repeated employing 6 phr. of a brominated polymethylol phenol resin containing 12 weight percent combined bromine, prepared by reacting Amberol ST-137 with HBr at room temperature, and 6 phr. of Amberol ST-137 in place of the 12 phr. of Amberol ST-137 used in Example 1. Each sample was cured at 307° F. for 30 and 60 minutes. The results are set forth in Table II.

The cure was considerably faster when part of the curing agent was halogenated resin. For instance sample #7 had a tensile strength which was 1200 p.s.i. greater after 30 minutes curing than sample #3 had for an equivalent period of time. This extraordinary difference is due to the use of halogenated resin. Furthermore, the covulcanizates showed no delamination and possessed outstanding stress-strain properties and they also had good flexing properties as demonstrated by the Goodrich flexometer data, which is unusual for butyl rubber-GR-S covulcanizates.

EXAMPLE 3

The foregoing experiment (Example 2) was repeated employing 10 phr. of a brominated polymethylol phenol resin containing 5 weight percent combined bromine, prepared by reacting the polymethylol p-octyl phenol-formaldehyde resin with HBr gas in benzene solution, in place of the resins used in Examples 1 and 2. Each sample was cured at 307° F. for 20, 40 and 60 minutes. The results are set forth in Table III. Cure activity of this 5% bromine methylol phenol resin is comparable to the resin system used in Example 2.

*Table II*

| Sample No. | 5 | | 6 | | 7 | | 8 | |
|---|---|---|---|---|---|---|---|---|
| | Parts by Weight | | | | | | | |
| Butyl | 100 | | 75 | | 25 | | | |
| GR-S | | | 25 | | 75 | | 100 | |
| Cure Time, min. @ 307° F | 30 | 60 | 30 | 60 | 30 | 60 | 30 | 60 |
| Modulus at 200%, p.s.i | 900 | 1,025 | 1,275 | 1,400 | 1,350 | 1,450 | 975 | 1,100 |
| Modulus at 300%, p.s.i | 1,575 | 1,750 | | | 2,300 | | 1,900 | 2,150 |
| Tensile, p.s.i | 2,300 | 2,270 | 1,500 | 1,590 | 2,620 | 2,330 | 3,250 | 3,230 |
| Elongation, percent | 425 | 390 | 280 | 260 | 340 | 290 | 430 | 390 |
| Hardness (Shore A) | 65 | 68 | 78 | 80 | 70 | 71 | 68 | 68 |
| Goodrich Flexometer @ 100° C., 89*/in.², 0.25" stroke: | | | | | | | | |
| Percent Permanent Set | 2.0 | | 2.3 | | 1.9 | | 2.4 | |
| Percent Dynamic Drift | 0.9 | | 0.5 | | 0.6 | | 0.0 | |
| Temperature Rise, °C | 26 | | 32 | | 30 | | 29 | |
| Appearance | Excellent | | Excellent | | Excellent | | Excellent | |

*Table III*

| Sample Number | 9 | | | 10 | | | 11 | | | 12 | | |
|---|---|---|---|---|---|---|---|---|---|---|---|---|
| | Parts by weight | | | | | | | | | | | |
| Compound Formulation: | | | | | | | | | | | | |
| GR-S-1500 | | | | 25 | | | 75 | | | 100 | | |
| Butyl Rubber | 100 | | | 75 | | | 25 | | | | | |
| HAF Carbon Black | 50 | | | 50 | | | 50 | | | 50 | | |
| Stearic Acid | 1.0 | | | 1.0 | | | 1.0 | | | 1.0 | | |
| Zinc Oxide | 5.0 | | | 5.0 | | | 5.0 | | | 5.0 | | |
| 5% Bromo-Resin | 10 | | | 10 | | | 10 | | | 10 | | |
| Cure Time, mins. @ 307° F | 20 | 40 | 60 | 20 | 40 | 60 | 20 | 40 | 60 | 20 | 40 | 60 |
| Modulus @ 200%, p.s.i | 600 | 925 | 1,000 | 1,050 | 1,250 | 1,350 | 600 | 1,050 | 1,450 | 350 | 750 | 1,050 |
| Modulus @ 300%, p.s.i | 1,100 | 1,600 | 1,750 | | | | 1,075 | 1,850 | 2,400 | 650 | 1,550 | 2,000 |
| Tensile, p.s.i | 2,220 | 2,350 | 2,330 | 1,170 | 1,410 | 1,470 | 2,020 | 2,650 | 2,860 | 2,070 | 3,340 | 3,500 |
| Elongation, Percent | 590 | 440 | 410 | 270 | 270 | 245 | 550 | 410 | 340 | 780 | 520 | 460 |
| Hardness (Shore A) | 65 | 65 | 68 | 78 | 78 | 80 | 67 | 69 | 71 | 65 | 70 | 68 |
| Crescent Tear (lbs./in.) | 293 | | | 264 | | | 217 | | | 232 | | |
| Goodrich Flexometer Data: @ 100° C., 0.25" Stroke, 32 cps. and 89#/in.² Load: | | | | | | | | | | | | |
| Percent Permanent Set | 4.6 | | | 8.4 | | | 4.9 | | | 13.7 | | |
| Percent Dynamic Drift | 1.5 | | | 2.7 | | | 1.3 | | | 4.0 | | |
| Temperature Rise, °C | 25 | | | 41.5 | | | 29 | | | 41 | | |
| Appearance | Excellent | | | Very good | | | Excellent | | | Excellent | | |

This resin, however, produces a compound having better scorch safety properties than the 12% bromine resin used in Example 2. Again, the convulcanizates exhibited good stress-strain properties and excellent flexing properties. These outstanding results are brought about by employing a bromomethyl, methylol phenol resin cure in accordance with the preferred embodiment of the invention. The resin contains the optimum amount of combined halogen to give a rapid vulcanization and superior vulcanizate properties.

EXAMPLE 4

The above experiment (Example 3) was repeated using 10 phr. (parts per hundred parts of rubber) of a chlorinated polymethylol phenol resin containing 6.2% combined chlorine, prepared by reacting the polymethylol-p-octyl phenol formaldehyde resin with HCl gas in benzene solution, in place of the resins used in previous examples. This resin was used to vulcanize a 50/50 blend of GR–S–1500 and butyl according to the same formula used in Example 1 for 30 and 60 minutes at 307° F. A sulfur cure was used as a control. The results are set forth in Table IV.

Table IV

|  | Parts by Wt. | Parts by Wt. |
|---|---|---|
| Butyl GR-I-25 | 50 | 50 |
| GR-S 1500 | 50 | 50 |
| HAF Carbon Black | 50 | 50 |
| Stearic Acid | 1.0 | 1.0 |
| Zinc Oxide | 5.0 | 5.0 |
| Chloro-Resin | 10.0 | |
| Sulfur | | 1.5 |
| Tuads [1] | | 1.0 |
| Altax [2] | | 1.0 |
| Cure Time, min. at 307° F | 30 / 60 | 30 / 60 |
| Modulus at 100%, p.s.i | 700 / 710 | |
| Modulus at 200%, p.s.i | 1,670 / 1,750 | |
| Tensile, p.s.i | 2,035 / 1,960 | 1,410 / 1,450 |
| Elongation, Percent | 250 / 230 | 80 / 80 |
| Goodrich Flexometer data at 100° C., 32 c.p.s., 0-25″ Stroke, 89 #/in. load: | | |
| Percent Permanent Set | 9.8 | Failed in 1 minute. |
| Percent Dynamic Drift | 3.9 | |
| Temperature Rise, ° C | 46 | |
| Appearance | Good (no porosity). | |

[1] Tetramethylthiuram disulfide.
[2] Benzothiazyldisulfide.

These data clearly demonstrate that it is advantageous to use the halogenated resin to cure this polymer blend.

The stress-strain properties are considerably better than those obtained with the sulfur cure. Excellent flexing properties were also obtained with the halogenated resin cure.

EXAMPLE 5

In order to demonstrate the effectiveness of the resin cure system in promoting convulcanization of butyl with other higher unsaturated rubbers, 50/50 blends were prepared with GR-S, natural rubber and paracril (butadiene-acrylonitrile synthetic rubber). All the blends were compounded according to the formula used in Example 1 and cured with 10 phr. of a 5% bromine resin of the type described in Example 3. A sulfur cure was run for comparative purposes. The results are set forth in Table V.

Table V

| No | 13 | | 14 | | 15 | | 16 | | 17 | | 18 | |
|---|---|---|---|---|---|---|---|---|---|---|---|---|
| Butyl 217 | 50 | | 50 | | 50 | | 50 | | 50 | | 50 | |
| GR-S 1500 | 50 | | 50 | | | | | | | | | |
| Natural Rubber | | | | | 50 | | 50 | | | | | |
| Paracril-BJ | | | | | | | | | 50 | | 50 | |
| HAF Carbon Black | 50 | | 50 | | 50 | | 50 | | 50 | | 50 | |
| Stearic Acid | 1.0 | | 1.0 | | 1.0 | | 1.0 | | 1.0 | | 1.0 | |
| Zinc Oxide | 5.0 | | 5.0 | | 5.0 | | 5.0 | | 5.0 | | 5.0 | |
| Bromo-Resin | 10.0 | | | | 10.0 | | | | 10.0 | | | |
| Sulfur | | | 1.5 | | | | 1.5 | | | | 1.5 | |
| Tuads | | | 1.0 | | | | 1.0 | | | | 1.0 | |
| Altax | | | 1.0 | | | | 1.5 | | | | 1.0 | |
| Cure Time at 307° F.: | 30 | 60 | 30 | 60 | 30 | 60 | 30 | 60 | 30 | 60 | 30 | 60 |
| Modulus at 100%, p.s.i | 700 | 900 | | | 710 | 860 | 1,600 | 1,580 | 1,200 | 1,470 | | |
| Modulus at 200%, p.s.i | 1,570 | 2,010 | | | 1,450 | | | | | | | |
| Tensile, p.s.i | 1,960 | 2,190 | 1,540 | 1,520 | 1,540 | 1,620 | 1,620 | 1,650 | 1,930 | 2,140 | 1,610 | 1,580 |
| Elongation, percent | 250 | 230 | 80 | 70 | 220 | 190 | 110 | 110 | 170 | 140 | 70 | 70 |
| Goodrich Flexometer operated at 100° C., 0.25″ Stroke, 32 c.p.s. and 148 lbs./in.² Load (pellet flexed to failure): | | | | | | | | | | | | |
| Time to failure (mins.) | 5 | | 2.7 | | 4 | | 1.5 | | 14.3 | | 1.0 | |

In all cases the bromo-resin covulcanizates had better stress-strain properties and flexing properties than the sulfur cure system.

Resort may be had to various modifications and variations of the present invention without departing from the spirit and scope of the appended claim. To be specific, such things as accelerators may be employed to even further increase the cure rate, e.g. a halogen containing substance; or other highly unsaturated polymers may be covulcanized, e.g. polybutadiene.

What is claimed is:

A process for covulcanizing butyl rubber, said butyl rubber being composed of a major proportion of isobutylene and a minor proportion of a diolefin, with a high unsaturation rubber selected from the group consisting of natural rubber, butadiene-styrene rubber, butadiene acrylonitrile rubber, and mixtures thereof; which comprises compounding the rubbers with 1–30 parts by weight per 100 parts of rubber of a compound selected from the class consisting of a 2,6-dihalomethyl para-$C_4$–$C_{16}$ alkyl phenol resin and a 2,6-dihalomethyl meta-$C_4$–$C_{16}$ alkyl phenol resin, said resin containing about 1–30 wt. percent of combined halogen; and heating until covulcanization occurs.

References Cited in the file of this patent

UNITED STATES PATENTS

| 2,467,322 | Lightbown et al. | Apr. 12, 1949 |
| 2,575,249 | Connell et al. | Nov. 13, 1951 |
| 2,588,993 | Schroeder | Mar. 11, 1952 |
| 2,701,895 | Tawney et al. | Feb. 15, 1955 |
| 2,721,185 | Schulze et al. | Oct. 18, 1955 |

(Other references on following page)

| | UNITED STATES PATENTS | |
|---|---|---|
| 2,726,222 | Palmquist et al. | Dec. 6, 1955 |
| 2,734,877 | Batts et al. | Feb. 14, 1956 |
| 2,788,839 | Kindle et al. | Apr. 16, 1957 |
| 2,898,321 | Shepard | Aug. 4, 1959 |
| 2,898,322 | Shepard | Aug. 4, 1959 |
| 2,918,448 | Viohl | Dec. 22, 1959 |
| 2,972,600 | Braidwood | Feb. 21, 1961 |

| | FOREIGN PATENTS | |
|---|---|---|
| 525,075 | Canada | May 15, 1956 |

OTHER REFERENCES

Van Der Meer: "The Vulcanization of Rubber with Phenol Formaldehyde Derivatives," Rec. des Trav. Chim., volume 63, No. 4, pages 147–169 (1944), pages 150 and 152 relied upon.